United States Patent
Martin et al.

(10) Patent No.: US 7,341,215 B2
(45) Date of Patent: Mar. 11, 2008

(54) FISHING REEL HAVING A ONE-PIECE SIDE PLATE AND BRIDGE

(75) Inventors: David H. Martin, Philadelphia, PA (US); John Joseph Todd, Springfield, PA (US)

(73) Assignee: Penn Fishing Tackle Mfg. Co., Philadelphia, PA (US)

( * ) Notice: Subject to any disclaimer, the term of this patent is extended or adjusted under 35 U.S.C. 154(b) by 0 days.

(21) Appl. No.: 11/580,262

(22) Filed: Oct. 12, 2006

(65) Prior Publication Data

US 2007/0246589 A1    Oct. 25, 2007

Related U.S. Application Data

(60) Provisional application No. 60/793,676, filed on Apr. 20, 2006.

(51) Int. Cl.
*A01K 89/01* (2006.01)

(52) U.S. Cl. .................................. 242/310; 242/249

(58) Field of Classification Search ........ 242/310–312, 242/249
See application file for complete search history.

(56) References Cited

U.S. PATENT DOCUMENTS

| | | | |
|---|---|---|---|
| 343,782 A * | 6/1886 | Hofe | .......................... 242/310 |
| 1,940,593 A | 12/1933 | Henze | |
| 2,643,131 A * | 6/1953 | King | .......................... 242/264 |
| 3,239,162 A | 3/1966 | Henze | |
| 3,961,438 A | 6/1976 | Henze | |
| 3,974,978 A | 8/1976 | Henze | |
| 4,056,246 A | 11/1977 | Purcell | |
| 4,130,251 A * | 12/1978 | Findley | ...................... 242/227 |
| 4,133,499 A | 1/1979 | Purcell | |
| 4,167,829 A | 9/1979 | Henze | |
| 4,251,940 A | 2/1981 | Henze | |
| 4,428,139 A | 1/1984 | Henze | |
| 4,560,118 A | 12/1985 | Weber | |
| 4,657,200 A | 4/1987 | Parylak | |
| 4,723,727 A | 2/1988 | Weber | |
| 4,770,362 A | 9/1988 | Effinger | |

(Continued)

OTHER PUBLICATIONS

Penn Fishing Tackle Mfg. Co., "Baja 113HN Fishing Reel", Drawing Figures 7-9 and photos 1-2, prior to Mar. 9, 2006, 3 pages.

(Continued)

*Primary Examiner*—Emmanuel M Marcelo
(74) *Attorney, Agent, or Firm*—Clement A. Berard, Esq.; Dann, Dorfman, Herrell & Skillman, PC (57) ABSTRACT

A fishing reel end plate may comprise a unitary disk having a generally central opening between a frame facing side and an exterior side thereof, a bridge proximate the frame facing side thereof and a wall joining a fundus and the exterior side thereof defining a first cavity open at the exterior side. The bridge may have a hole spaced apart from a generally central opening for receiving a stud. The unitary disk may have a second cavity open at the frame facing side and separated from the first cavity by a common portion of the wall, and the common wall portion may have an opening between the first and second cavities. The end plate may be mounted to the frame of a fishing reel.

32 Claims, 6 Drawing Sheets

U.S. PATENT DOCUMENTS

| | | | |
|---|---|---|---|
| D310,116 S | 8/1990 | Effinger | |
| 5,308,019 A * | 5/1994 | Karlsson | 242/279 |
| 5,556,050 A | 9/1996 | Baisch | |
| 5,575,432 A | 11/1996 | Baisch | |
| 5,803,385 A | 9/1998 | Baisch | |
| 6,053,446 A | 4/2000 | Henze | |
| 6,113,019 A | 9/2000 | Jewell | |
| 6,152,390 A | 11/2000 | Datcuk, Jr. | |
| 6,199,782 B1 * | 3/2001 | Oishi | 242/312 |
| 6,318,655 B1 | 11/2001 | Henze | |
| D451,576 S | 12/2001 | Datcuk, Jr. | |
| D451,577 S | 12/2001 | Duarte | |
| 6,364,228 B1 | 4/2002 | Datcuk, Jr. | |
| 6,402,073 B1 | 6/2002 | Datcuk, Jr. | |
| 6,648,256 B1 | 11/2003 | Baisch | |
| 6,827,306 B1 | 12/2004 | Datcuk, Jr. | |
| 6,830,208 B2 | 12/2004 | Datcuk, Jr. | |
| D502,754 S | 3/2005 | Tao | |
| 6,860,442 B2 | 3/2005 | Datcuk, Jr. | |
| 6,877,686 B2 | 4/2005 | Datcuk, Jr. | |
| 6,880,776 B2 * | 4/2005 | Kitajima | 242/310 |
| 7,017,845 B2 | 3/2006 | Clark | |
| 7,025,295 B2 | 4/2006 | Wiest | |

OTHER PUBLICATIONS

Penn Fishing Tackle Mfg. Co., "Baja 113HN Fishing Reel", Figures 1-7, photographs taken prior to Mar. 13, 2006, 4 pages.

Penn Fishing Tackle Mfg. Co., "2005 Product Catalog", 2005, cover and pp. 3, 8-29.

Penn Reels, Penn Special Senator Series Instruction Manual, 17 pages, 1997.

Penn Reels, Parts List for Model 113HN, Mar. 17, 2005.

Penn Reels, Parts List for Models 113HN, 113HLW and 113 HSP, Jan. 6, 2004.

* cited by examiner

FISHING REEL HAVING A ONE-PIECE SIDE PLATE AND BRIDGE

This Application claims the benefit of the priority of U.S. Provisional Patent Application No. 60/793,676 filed Apr. 20, 2006, which is hereby incorporated herein by reference in its entirety.

The present invention relates to a fishing reel and end plate, and, in particular, to a fishing reel having a unitary end plate and bridge An angler's action in reeling in a hooked fish is applied to a handle of the fishing reel and is coupled via a gearing arrangement located behind the end plate of the reel to rotate a spool to wind the line thereon, thus to eventually draw the hooked fish to where it may be lanced or netted or otherwise finally caught. Fishing reels, particularly fishing reels intended for fishing for substantial and large sport and game fish, must have components that are designed and manufactured to withstanding the substantial forces and stresses that occur when fighting and reeling in a large and active sport or game fish, such as a tuna, marlin, shark or other large game fish, which routinely weigh several hundred pounds (e.g., over 100 kilograms), and can exceed 1000 pounds (about 450 Kg) in weight.

Conventionally, sport fishing reels have a side plate attached to the frame of the fishing reel, and the side plate is made very rigid and thick to withstand the potential forces and stresses. A generally flat and thick bridge attached behind the end plate supports the main gear that is turned by the handle in the reeling in process, and typically is attached to the end plate by a number of screws, e.g., by four screws. An example of such reel is the Baja 113HN reel available from Penn Fishing Tackle Manufacturing Company of Philadelphia, Pa. While such fishing reel is of exceedingly high quality and has been proven by many years of successful use, the manner of attaching the bridge to the end plate by a plurality of screws, while extremely durable, seems to be less than optimum.

In addition, because the gearing as well as ratcheting and eccentric mechanisms are behind the end plate, normal lubrication and other maintenance, as well as repairs, require that the end plate be removed from the frame of the fishing reel, which can be somewhat inconvenient.

Accordingly, there is a desire for an arrangement for a fishing reel that is more conveniently accessible for maintenance and that might provide a stronger end plate.

To this end, a fishing reel end plate may comprise

A fishing reel end plate may comprise a unitary disk having an opening between a frame facing side and an exterior side thereof, and having a bridge proximate the frame facing side thereof and a wall joining the fundus and the exterior side thereof defining a first cavity open at the exterior side. The bridge may have a hole for receiving a stud therein. The unitary disk may have a second cavity open at the frame facing side and separated from the first cavity by a common portion of the wall which may have an opening between the first cavity and the second cavity.

BRIEF DESCRIPTION OF THE DRAWING

The detailed description of the preferred embodiment(s) will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

Figure 1:
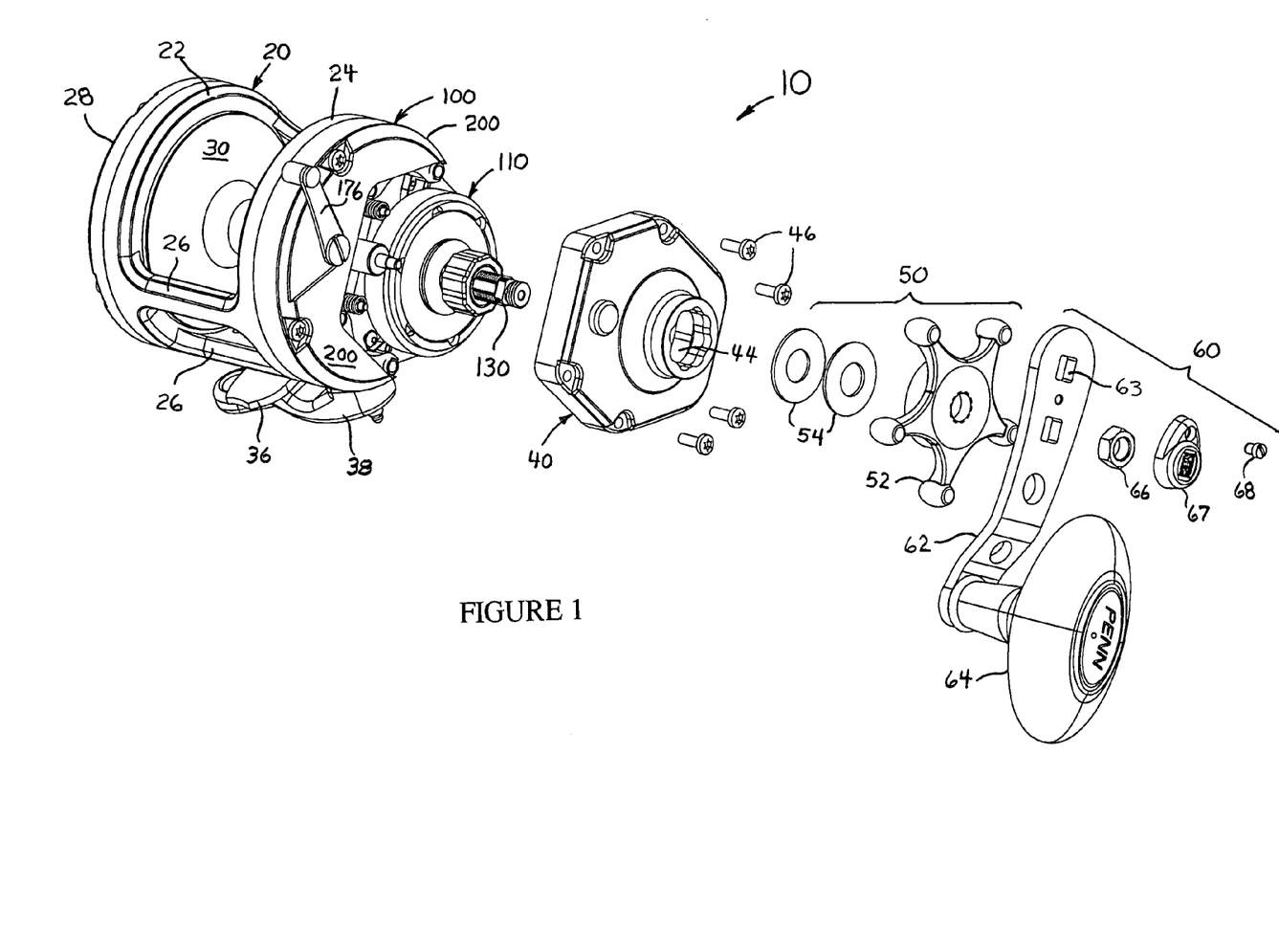
FIG. 1 is a partially exploded isometric view of an example embodiment of a fishing reel.

Example fishing reel 10 is described in relation to FIG. 1 which is a partially exploded isometric view of an example embodiment of a fishing reel 10. Fishing Reel 10 comprises a frame 20 having a first circular frame member 22, a second circular frame member 24, and one or more frame cross members 26 to which circular members 22 and 24 are attached to provide the rigid frame 20. A spool 30 is disposed within frame 20 between circular frame members 22, 24 and is rotatable therein for winding and unwinding fishing line thereon. Typically, spool 30 includes and is rotatable with a spindle that extends through respective openings in left and right frame ring members 22, 24 and is supported therein by respective bearings (not visible) of any suitable type.

Typically, a circular side plate 28 is attached to circular frame member 22, e.g., by a number of screws, to cover and protect the spindle end and bearing for the left end of the spindle with which spool 30 is rotatable. Typically, a circular side plate assembly 100 is attached to circular frame member 24, e.g., by a number of screws 46, to cover and protect the spindle end and bearing for the right end of the spindle with which spool 30 is rotatable. Stand 36 is attached to frame 20 for providing a mounting by which reel 10 may be mounted to a fishing rod (not shown), e.g., by a rod clamp 38 attaching to stand 36 or by mounting hardware of the fishing rod, or by any other suitable means, as may be convenient.

Frame member 22 is typically referred to as the left frame member and frame member 24 is typically referred to as the right frame member for a typical fishing reel 20, as where intended for convenient use by a right-handed fisherman, although fishing reel 10 may be mounted in a 180° rotated position for opposite-hand use, or an opposite hand (e.g., mirror image) fishing reel may be provided for left-handed fishermen, if desired. Thus the terms "left" and "right" as used herein are not limiting.

Side plate assembly 100 includes side plate 200 which houses the gearing arrangement 110 that couples via gear sleeve 130 the rotational forces applied by a fisherman to crank handle 60 to cause spool 30 to rotate and thereby to reel in line in the fishing process. Because substantial forces may be applied while reeling in a catch, side plate assembly 100 is typically of a substantial thickness for strength. Gearing arrangement 110 is disposed in a cavity of side plate assembly 100 and is covered by a cover 40 that is mounted to end plate 100 by a plurality of cover screws 46 and that has a generally central opening 44 through which a drive shaft 130, also called a gear sleeve 130, for gearing arrangement 110 extends so that crank handle 60 may be mounted thereon. Cover 40 may be substantially thinner and lighter than is side plate assembly 100.

Crank handle 60 comprises a crank arm 62 and a handle 64 at the end thereof and may be attached to gearing arrangement 110 by a suitable fastener 66 in any convenient manner, such as by handle nut 66 threading onto gear sleeve 130. Handle nut 66 may be covered by a trim cover 67 that may be fastened to crank arm 62 by trim cover screw 68. Crank arm 62 may have one or more openings 63 spaced at different distances from gear sleeve 130 for engaging gear sleeve 130 with greater or lesser mechanical advantage, such as the two generally square shaped openings 63 illustrated.

Disposed between crank handle 60 and gearing arrangement 110 is a drag controlling (braking) arrangement 50 which may include a star drag wheel 52 on gear sleeve 130 and drag washers 54 which are stacked in various sequences on gear sleeve 130. Drag wheel 52 may thread onto gear sleeve 130, and is rotatable for adjusting the degree of drag between handle 60 and spool 30. Typically, a plurality of drag washers 54 are stacked, e.g., metallic washers and non-metallic washers are stacked in various alternating sequences for controlling the drag that can be applied between handle 60 and spool 30.

Eccentric lever 176 is movable by about 90° for engaging and disengaging the gearing between spool 30 and gear arrangement 110 so that spool 30 can be released to freely rotate so as to play out line without drag and without gear sleeve 130 rotating and without handle 60 rotating with gear sleeve 130.

Side plate 200 will next be described followed by a description of side plate assembly 100 which comprises side plate 200 and the gearing arrangement 110 and other elements that may be attached thereon and/or mounted thereto.

Figure 2:
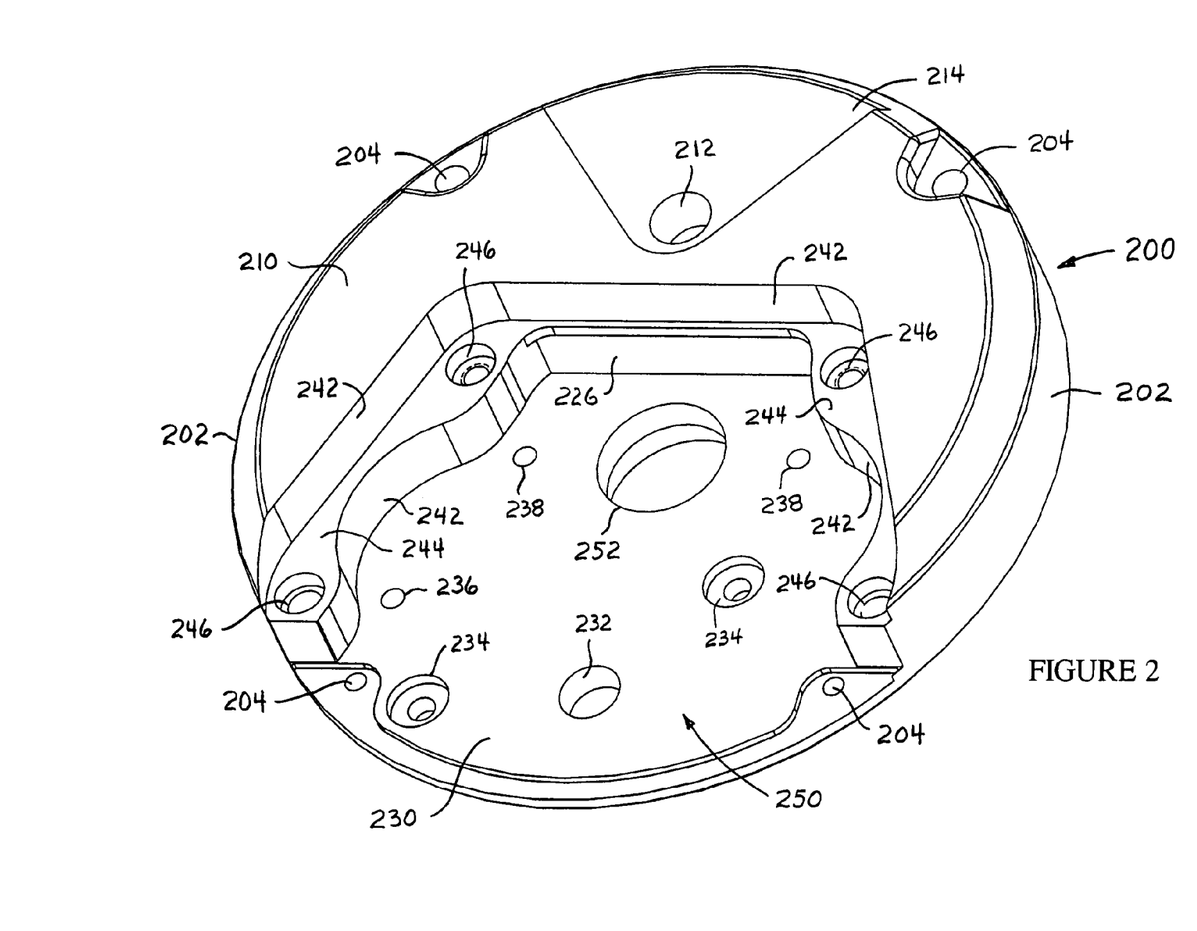
FIG. 2 is an isometric view of an exterior-facing side of an example embodiment of a side plate of the example fishing reel of FIG. 1.
Figure 3:
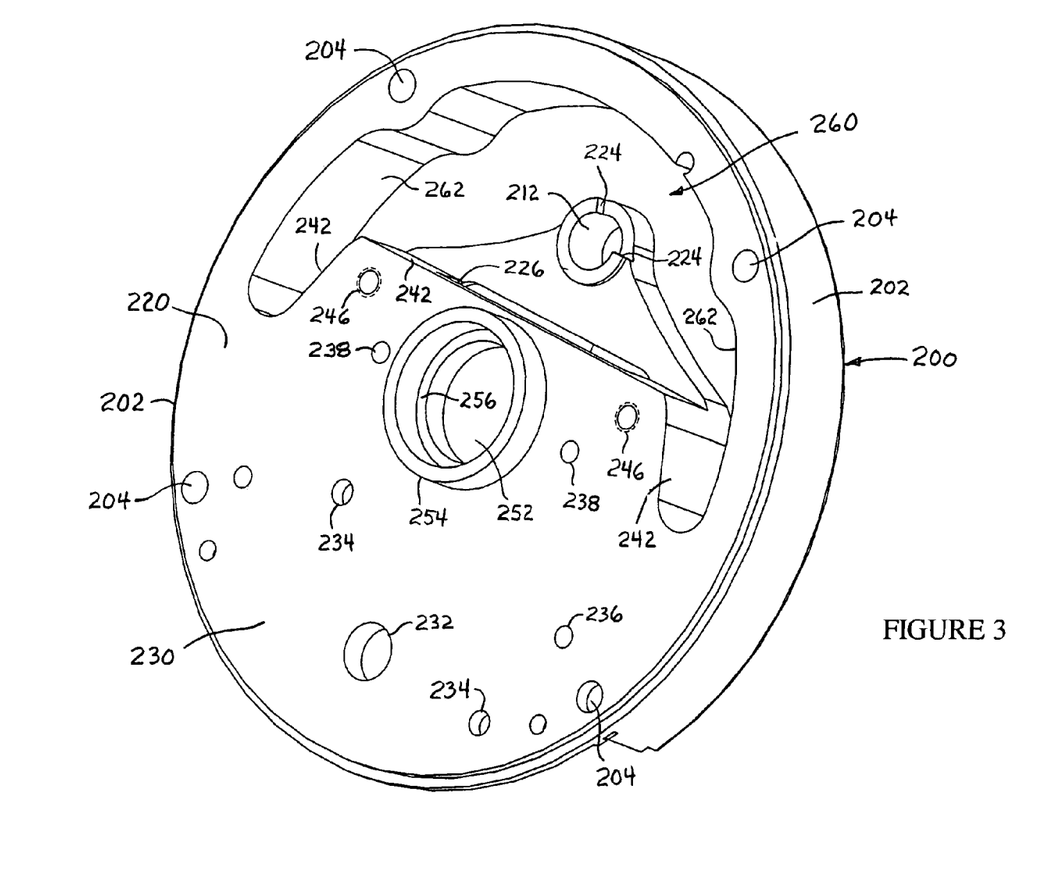
FIG. 3 is an isometric view of the reel-facing side of the example embodiment of the side plate as shown in FIG. 2.

Example fishing reel 10 is further described in relation to FIG. 2 which is an isometric view of an exterior-facing side 210 of an example embodiment of a side plate 200 of the example fishing reel 10 of FIG. 1, and in relation to FIG. 3 which is an isometric view of a reel-facing side 220 of the example embodiment of the side plate 200 as shown in FIG. 2.

Side plate 200 is a generally circular one-piece (unitary) disk having a generally circular periphery 202 defined between the generally circular edges of exterior facing side 210 and of reel-facing side 220. Plural holes 204 may be provided spaced apart around the periphery, e.g., about 90° apart, for receiving screws for mounting side plate 200 to frame 20 of reel 10, e.g., to frame ring 28 of frame 20. Holes 204 may include recesses for seating the heads of the screws that mount side plate 200 to frame 20, e.g., recesses for presenting a neat appearance, as may be seen in FIG. 1.

A bridge member 230 integral with side plate 200 and a segmented wall 242 thereof define a recess or cavity 250 for receiving gearing arrangement 110. Wall 242 may have a shoulder 244 defining the base of a recess or cavity 240 for receiving cover 40 which is secured thereto by screws 46 threading into holes 246 in shoulder 244. Shoulder 244 is intermediate exterior side 210 and bridge member 230 which are typically provided as generally parallel surfaces. Bridge member 230 typically has a number of holes therethrough for mounting various elements of gearing arrangement 110 that are described below, for example, bridge 230 may have a hole 232 for mounting gear stud 120, holes 234 for receiving pivots 162 for dogs 160, holes 236 for receiving screws 166 that attach dog springs 164, and holes 238 that receive yoke pins 194 that guide pinion yoke 190, as described below.

Bridge 230 also typically has a generally centrally located hole 252 through which the spindle 32 of spool 30 passes and in which spindle 32 is rotatably supported. Surrounding spindle hole 252 concentrically and extending axially away from reel-facing side 220 of side plate 200 is a ring 254 that defines a seat 256, e.g., for receiving a bearing for rotatably supporting spindle 32 in hole 252, and that strengthens bridge member 230 at the supporting location for spindle 32.

Side plate 200 may have a cavity 260 in the reel-facing side 220 thereof for receiving elements of the eccentric arrangement 170 described below for engaging and disengaging spindle 32 of spool 30 from gearing arrangement 110. In such case, side plate 200 may also have a hole 212 between exterior side 210 and cavity 260 for receiving the eccentric 172. Bosses 224 or shoulders 224 may be provided at the reel-facing end of hole 212, i.e. the end that is in eccentric cavity 260, for limiting the rotation of eccentric 172 and eccentric lever 176, e.g., to about 90° of rotation. In addition, an opening 226 may be provided in the segment of wall 242 separating gearing cavity 250 from eccentric cavity 260 through which jack 180 may pass to couple eccentric 172 to pinion yoke 190, as described below.

Side plate 200 may be made by any suitable means, including, for example, machining, forging, casting, and the like, and may be of any material of suitable strength and durability, including, for example, aluminum, brass, bronze, steel, stainless steel, plastic, nylon, and the like. Similarly, cover 40 may be similarly made and of similar materials, but may be of lighter gage than is side plate 200.

Figure 4:
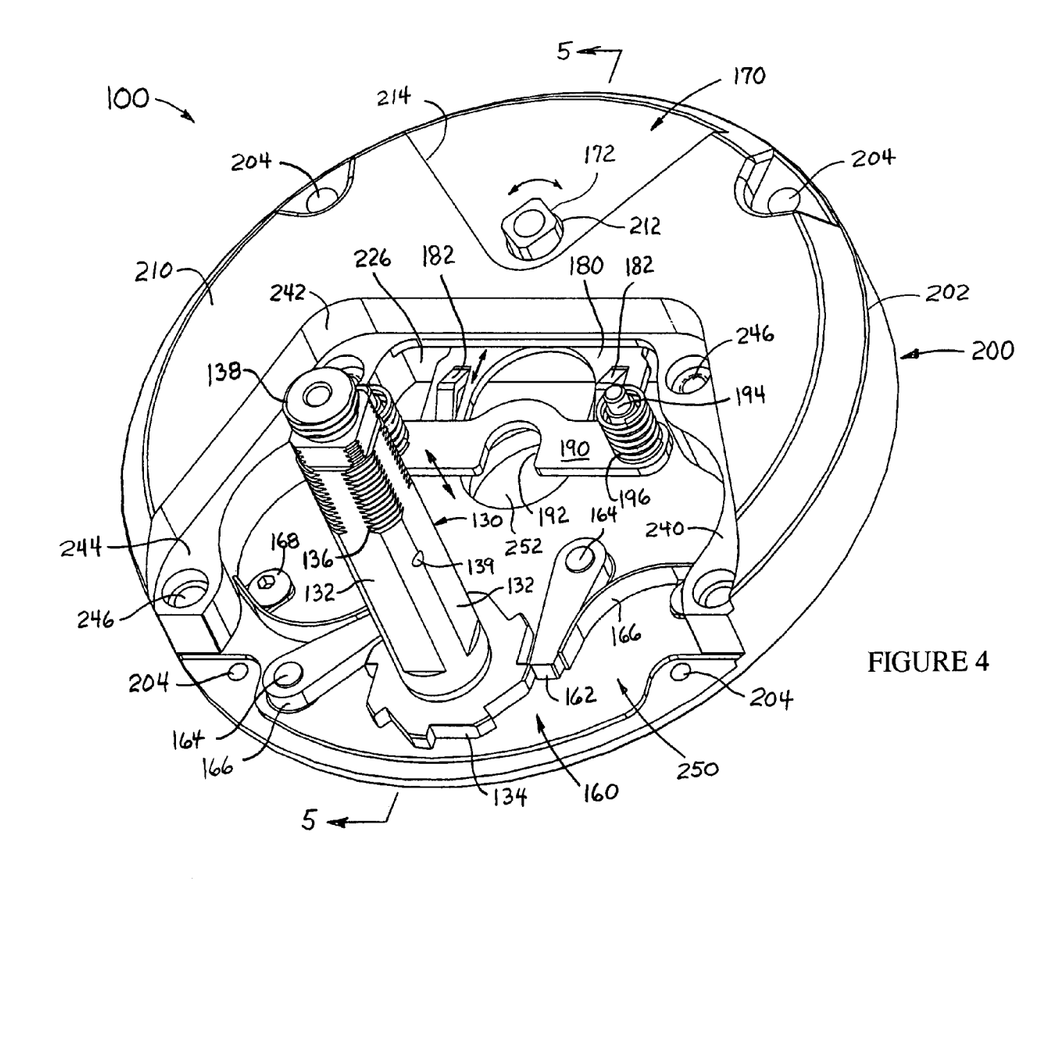
FIG. 4 is an isometric view of an example embodiment of a side plate assembly (shown with gears removed for clarity) of the example fishing reel shown in FIG. 1.
Figure 5A:
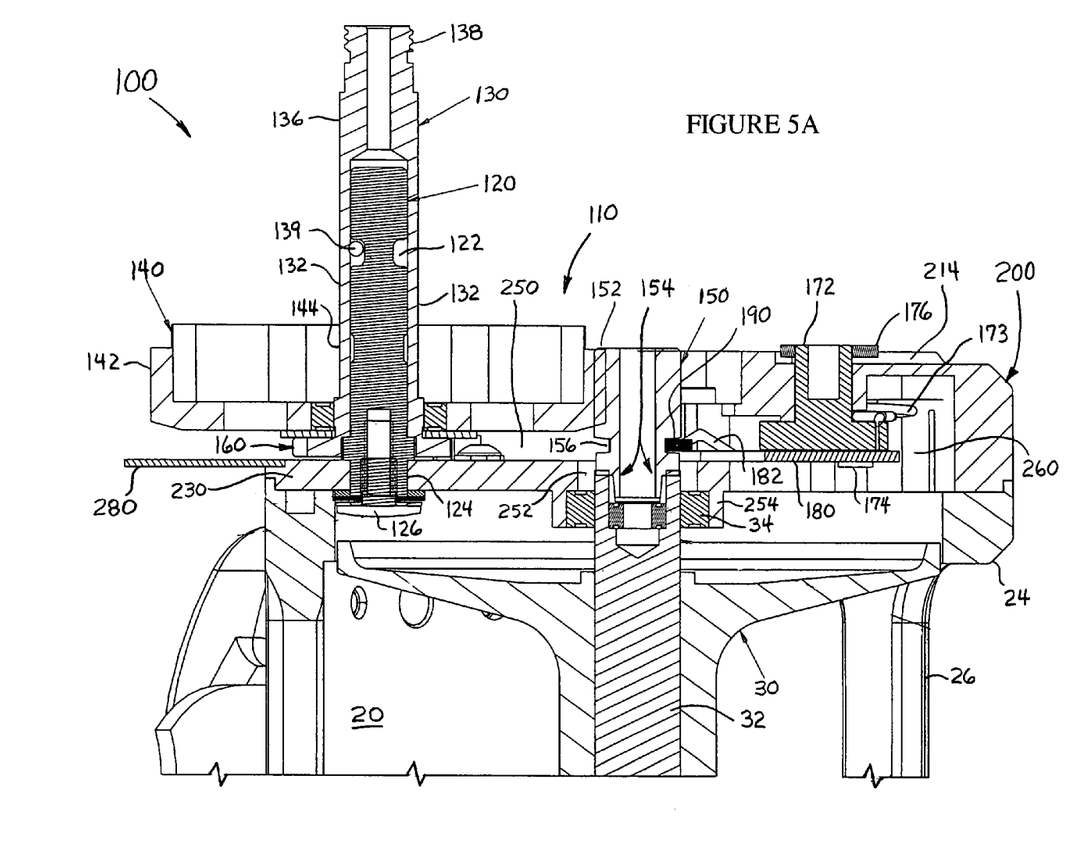
FIG. 5A is a cross-sectional side view of the example side plate assembly shown in FIG. 4 including the gears thereof.
Figure 5B:
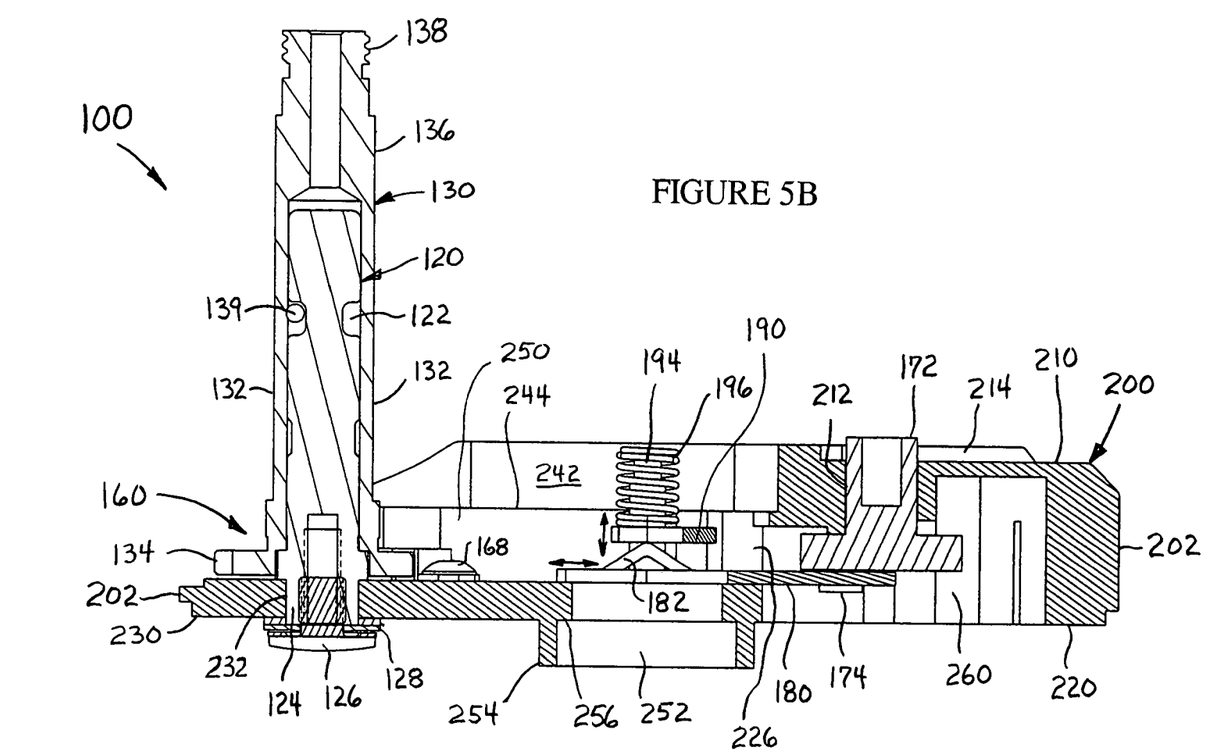
FIG. 5B is a cross-sectional side view of the example side plate assembly shown in FIGS. 4 and 5A, but excluding the gears thereof.

Example fishing reel 10 is now further described in relation to FIG. 4 which is an isometric view of an example embodiment of a side plate assembly 100 (shown with gears 110, 130, 140 removed for clarity) of the example fishing reel 10 shown in FIG. 1, in relation to FIG. 5A which is a cross-sectional side view of the example side plate assembly 100 shown in FIG. 4 including the gears 110, 130, 140 thereof, and in relation to FIG. 5B which is a cross-sectional side view of the example side plate assembly 100 shown in FIGS. 4 and 5A, but excluding the gears 110, 130, 140 thereof.

Gearing arrangement 110 will first be described, followed by the ratcheting arrangement thereof which causes gearing arrangement to rotate in only one direction, and the eccentric arrangement 170 which engages and disengages gearing arrangement 110 from the spindle 32 of spool 30 so that spool 30 free-wheels, e.g., rotates freely.

Gearing arrangement 110 comprises a gear sleeve 130 that is rotatably mounted on a gear stud 120 that is mounted in gear stud hole 232 of bridge member 230 of side plate 200. Gear stud 120 extends substantially perpendicularly from bridge member 230 in a direction away from side plate 200. Mounting end 124 of gear stud 120 is secured in hole 232 of bridge member 230 by retaining screw 126 and washer 128 in the internally threaded hole in end 124 thereof.

Gear sleeve 130 is retained on gear stud 120 by a pin 139 passing tangentially through a pair of holes in gear sleeve 130 and groove 122 of gear stud 120, so that when gear sleeve 130 is rotated about the axis of gear stud 120, pin 139 moves in groove 122 so that gear sleeve 130 is free to rotate about gear stud 120, but is not free to move axially with respect to gear stud 120.

Gear sleeve 130 has a non-circular cross-section in a region whereat main gear 140 is disposed thereon so that main gear 140 is not free to rotate about gear sleeve 130, but is constrained to rotate coaxially with gear sleeve 130 about gear stud 120. One example of such non-circular cross-section may include one or more flats 132 where main gear 140 has a central hole 144 of generally corresponding shape and size for a slip fit on gear sleeve 130.

Teeth 142 of main gear 140 extend radially outward around the periphery thereof and preferably have substantial axial length for engaging the teeth 152 of pinion gear 150 which rotates coaxially with spool 30 and spindle 32 which is supported in spindle hole 252 by spindle bearing 34. Teeth 152 of pinion gear 150 extend radially outward around the periphery thereof and preferably have substantial axial length for engaging the teeth 142 of main gear 140. The axial length of the teeth 142, 152 of main and pinion gears 140, 150 preferably have substantial axial length for withstanding the loads thereon even with normal axial displacement of gears 140, 150, e.g., due to tolerance and variation in the actuation of eccentric arrangement 170.

Pinion gear 150 has an engaging feature 154 on the end thereof proximate to spindle 32 which has a corresponding engaging feature thereat. The corresponding engaging features of spindle 32 and pinion gear 150 providing a engagement interface 154 so that spindle 32 and pinion gear 150 rotate coaxially when engaging interface 154 is engaged, and so that spindle 32 and pinion gear 150 are free to rotate independently when engagement interface 154 is not engaged, e.g., when pinion gear 150 is moved axially away from spindle 32 as described below.

Various forms of engaging features may be employed with engaging interface 154 between spindle 32 and pinion gear 150. For example, spindle 32 may have a diametric slot and pinion gear 150 may have a diametric projection that fits into the diametric slot of spindle 32, or oppositely, pinion gear 150 may have the slot and spindle 32 may have the corresponding projection. Alternatively, one of spindle 32 and pinion gear 150 may have a splined shaft extending therefrom and the other of spindle 32 and pinion gear 150 may have a splined recess into which the splined shaft fits. Any suitable pair of engaging projections and corresponding slots, grooves or other recesses may be employed.

Gear arrangement 110 may also include a ratcheting arrangement 160 which constrains gearing arrangement 110 to rotate in only one direction. For example, gear sleeve 130 may include toothed ratchet wheel 134 integral therewith or attached thereto to rotate with gear sleeve 130. One or more dogs 162 may be provided to ride over the teeth of ratchet wheel 134 when ratchet wheel 134 rotates in a first direction and to engage the teeth of ratchet wheel 134 when ratchet wheel 134 seeks to rotate in a second direction opposite the first direction. Dogs 162 are rotatable about dog pivots 164 which are disposed in holes 234 of bridge member 230 and are biased towards ratchet wheel 134 by dog springs 166 which are secured to bridge member 230 by fasteners 168, e.g., screws 168. Dog pivots 164 may be shafts or posts or pins that are integral with dogs 160 or may be separate shafts or posts or pins that are disposed in and extend from holes 234 of bridge member 230.

Gear sleeve 130 also includes a threaded end 138 distal bridge member 230 whereat crank handle 60 may be attached, e.g., by handle nut 66 or another fastener. Thus, a fisher by cranking handle 60 will rotate main gear 140 which rotates pinion gear 150 which when engaged with spindle 32 causes spool 30 to rotate to take up fishing line onto spool 30 or, absent ratcheting arrangement 160, to play out fishing line from spool 30. Preferably, crank handle 60 and gear sleeve 130 are rotatable only in the direction to take up fishing line onto spool 30. Also preferably, fishing line may be let out from spool 30 by disengaging pinion gear 150 from spindle 32 at engagement interface 154.

Eccentric release arrangement 170 may be provided to engage and disengage gearing arrangement 110 and crank handle 60 from the spindle 32 of spool 30 so that spool 30 free-wheels. While such disengagement may be provided at several junctions, e.g., that between main gear 140 and pinion gear 150, a preferred example disengagement arrangement provides disengagement at the interface 154 between pinion gear 150 and spindle 32 of spool 30. Eccentric arrangement 170 is actuated by moving eccentric lever 176 over about 90° of rotation, where pinion gear 150 and spindle 32 are engaged at interface 154 when eccentric lever 176 is at one extreme of its rotational range and are disengaged when eccentric lever 176 is at the other extreme of its rotation range.

Eccentric lever 176 is attached, e.g., by a screw, to eccentric 172 which is rotatable (e.g., curved double-ended arrow) in eccentric hole 212 of side plate 200. Eccentric 172 is preferably freely rotatable in eccentric hole 212 which preferably has bosses 224 about 90° apart rotationally so as to limit the rotation of eccentric 172 to about 90° of rotation. Preferably, one or more eccentric springs 173 may be provided to bias eccentric 172 to flip towards, i.e. be detented towards, the two opposite extremes of its about 90° of rotation.

Eccentric 172 has a post or pin 174 extending axially therefrom at a location offset from the rotational axis of eccentric 172 so that post 174 translates towards and away from pinion gear 150 and spindle 32 as eccentric 172 is rotated by about 90° (e.g., curved double-ended arrow) by eccentric lever 176. Jack 180 is slidably disposed through opening 226 of side plate 200 and engages off-center post 174 of eccentric 172 so as to be translated towards and away (e.g., double-ended arrow) from pinion gear 150 and spindle 32 by off-center post 174 as eccentric 172 is rotated. Thus, moving eccentric lever 176 causes jack 180 to translate through opening 226 of side plate 200 between gearing mechanism recess 250 and eccentric mechanism recess 260, i.e. along a line extending radially from spindle hole 252 of side plate 200 (e.g., double-ended arrow).

Jack 180 has, e.g., a pair of inclined lifters 182 extending in a direction away from bridge member 230 and located on jack 180 in a position that is approximately even with the axis of spindle 32 and pinion gear 150 when post 174 is closest thereto and is away from that position, i.e. off axis, when post 174 is farthest from spindle 32 and pinion gear 150. Pinion yoke 190 may ride on yoke pins 194 so as to be translatable closer to and farther away from bridge member 230, i.e. axially with respect to spindle 32 (e.g., double-ended arrow), and is urged downward against jack 180 by clutch springs 196 so as to ride on inclined lifters 182 of jack 180. Clutch springs 196 are held in place on yoke pins 194 and are compressed by cover 40 when cover 40 is seated on side plate 200.

Pinion yoke 190 has a cutout slot 192 that is of a size and shape to engage circumferential groove 156 of pinion gear 150 when yoke 190 is positioned on yoke posts 194. Thus, pinion gear 150 is free to rotate with respect to pinion yoke 190, but is constrained by cutout 192 of pinion yoke 190 engaging groove 156 to move axially therewith. When jack 180 and pinion yoke 190 move pinion gear 150 distal from spindle 32, interface 154 therebetween becomes disengaged, and when jack 180 and pinion yoke 190 move pinion gear 150 proximate to spindle 32, interface 154 therebetween becomes engaged.

Thus, in summary, eccentric arrangement 170, jack 180 and yoke 190 as described in the preceding paragraphs cause pinion gear 150 and spindle 32 to engage and disengage in response to movement of eccentric lever 176 so that spool 30 may be connected via gearing arrangement 110 to rotate responsive to cranking of handle 60 or may be free to rotate in either direction free of restraint by handle 60 and/or ratcheting arrangement 160.

Gear sleeve 130 also has drag threads 136 relatively distal bridge member 230 for threadably engaging star drag wheel 52 thereon. After cover 40 is mounted, drag washers 54 are placed on gear sleeve 130 in a desired sequence of metallic and non-metallic washers 54 relating to a desired degree of drag, and star drag wheel 52 would be threaded onto threads 136 of gear sleeve 130. Metallic washers 54 have a non-circular center hole so as to rotate with gear sleeve 230 and non-metallic (e.g., a relatively high coefficient of friction material) washers 54 have a non-circular periphery, e.g., are tabbed or have "ears," so as to be fixed to corresponding features (e.g., slots) of center hole 44 of cover 40. As a result, when handle 60 is cranked, some of washers 54 rotate with gear sleeve 230 and some washers 54 are fixed with respect thereto, so that friction between the contacting surfaces of adjacent washers 54 provides a desired degree of drag.

In use, star wheel 52 is tightened and loosened to exert greater or lesser compression of washers 54 between the circular end surface of opening 44 of cover 40 and drag wheel 52 thereby to increase and decrease drag, e.g., due to increasing and decreasing friction between adjacent metallic and non-metallic washers 54. The number and ordering of metallic and non-metallic washers 54 may be changed (remove handle 60 and star wheel 52, rearrange/add/remove washers 54, reassemble star wheel 52 and handle 60) to obtain greater or lesser ranges of drag.

In a typical example of an assembly sequence, eccentric arrangement 170, if provided, could be assembled with side plate 200 and side plate 200 mounted to frame 20, and then gearing arrangement 110 including ratcheting arrangement 160, if provided, could be assembled thereto. Cover 40 could be mounted thereon followed by drag arrangement 50 and handle 60.

Potential advantages of the described arrangement may include a one-piece side plate 200 that includes bridge 230 and that may have greater strength and rigidity than does the prior art separate side plate and bolted-on bridge, that may provide for ease of assembly, that may provide visibility of elements of gearing arrangement 110 and eccentric mechanism 170 during assembly, that may provide ease of accessibility (remove handle 60, drag 50 and cover 40), and that may provide ease of maintenance and repair. The foregoing potential advantages may be appreciated by fishermen who may have to service, maintain or repair fishing reel 10 under adverse conditions, e.g., on a boat and possibly in weather.

A fishing reel 10 having a one piece end plate 200 may comprise: a frame 20; a spool 30 rotatably mounted in the frame 20; a one piece end plate 200 mounted on an end 22, 24 of the frame 20, the one piece end plate 20 defining a bridge 230 for supporting at least one gear 110 and defining a cavity 250 for receiving at least one gear 110; at least one gear 110 disposed in the cavity 250 of the one piece end plate 200 and supported by the bridge 230 of the one piece end plate 200; a rotatable handle 130, 60 extending from the at least one gear 110 for coupling the rotatable handle 130, 60 and the spool 30 for rotating the spool 30 in response to rotation of the handle 130, 60; and a cover 40 mounted to the one piece end plate 200 for covering the at least one gear 110. The cavity 250 of the one piece end plate 200 and the at least one gear 110 mounted therein may be accessible from exterior the fishing reel 10 when the one piece end plate 200 is mounted to the frame 20 and when the cover 40 is removed. The fishing reel 10 may further comprise a ratchet 160 in the cavity 250 of the one piece end plate 200 for constraining the at least one gear 110 to rotate in only one direction. The fishing reel 10 may further comprise a pinion gear 150 coupled between the at least one gear 110 and the spool 30 and rotatable with the spool 30; or a pinion gear 150 coupled between the at least one gear 110 and the spool 30, wherein the pinion gear 150 is rotatable with the spool 30 and is slideable axially, and a jack 180 for slideably moving the pinion gear 150 for engaging and disengaging the pinion gear 150 from rotation with the spool 30; or any combination of the foregoing. The fishing reel 10 may further comprise a drag wheel 50, 52 threadingly engaging a shaft 130 supporting the at least one gear 110 and a plurality of drag washers 54 on the shaft 130 between the at least one gear 110 and the drag wheel 50, 52.

A fishing reel end plate 100 may comprise: a one piece plate 200 having a periphery 202, having a frame facing side 220 and an opposing exterior side 210, and having an opening 252 between the frame facing and exterior sides 220, 210 thereof, the one piece plate 200 having a bridge 230 proximate the frame facing side 220 thereof for supporting at least one gear 110 and defining a first cavity 250 open at the exterior side 210 thereof for receiving at least one gear 110; a gear stud 120 extending from the bridge 230 of the one piece plate 200; a gear sleeve 130 supported by the gear stud 120 and rotatable about the gear stud 120, wherein an end 136, 138 of the gear sleeve 130 distal the bridge 230 of the one piece plate 200 extends out of the first cavity 250 of the one piece plate 200 for receiving a handle 60; at least one gear 110 supported by the gear sleeve 130 and rotatable therewith in the first cavity 250 of the one piece plate 200 for engaging a rotatable shaft 32 extending through the opening 252 between the frame facing and exterior sides 220,210 of the one piece plate 200; and a cover 40 attached to the exterior side 210 of the one piece plate 200 for covering the at least one gear 110. The bridge 230 of the one piece plate 200 may provide a substantially planar fundus 230 of the first cavity 250 of the one piece plate 200, and a wall 242 joining the fundus 230 and the exterior side 210 of the one piece plate 200 may define a shoulder 244 for receiving the cover 40, and the cover 40 may have an opening 44 through which the gear sleeve 130 extends. The gear sleeve 130 may include a ratchet 160, 162 engaging a dog 162 for allowing the gear sleeve 130 and the gear 110 to rotate in only one direction, and may be threaded near the distal end 138 thereof. A drag wheel 50, 52 may threadingly engaging the distal end 138 of the gear sleeve 130 and a plurality of drag washers 54 may be on the gear sleeve 130 between the at least one gear 110 and the drag wheel 50, 52. The fishing reel end plate 100 may further comprise a pinion gear 150 on the rotatable shaft 32, wherein the pinion gear 150 may be rotatable with the shaft 32, may be slideable axially thereon, and may engage the at least one gear 110 in the first cavity 250 of the one piece plate 200 for rotating the rotatable shaft 32 extending through the opening 252 between the frame facing and exterior sides 220, 210 of the one piece plate 200. A jack 180 may be provided for slideably moving the pinion gear 150 on the rotatable shaft 32 for engaging and disengaging the pinion gear 150 from rotation with the rotatable shaft 32. The one piece plate 200 may have a second cavity 260 open to the frame facing side 220 thereof, and the fishing reel end plate 100 may further comprise an eccentric mechanism 170 disposed in the second cavity 260 and coupled to a yoke 190 of the jack 180 in the cavity 250 of the one piece plate 200 for slideably moving the pinion gear 150 on the rotatable shaft 32. The fishing reel end plate 100 may further comprise a handle mounted 60 to the distal end 138 of the gear sleeve 130 for rotating the gear sleeve 130 and the at least one gear 110.

A fishing reel end plate 100 may comprise: a unitary disk 200 having a periphery 202, having a frame facing side 220 and an opposing exterior side 210, and having a generally central opening 252 between the frame facing and exterior sides thereof 220,210, the unitary disk 200 having a substantially planar bridge 230 proximate the frame facing side 220 thereof defining the fundus 230 of a first cavity 250 open at the exterior side 220 thereof and having a wall 242 joining the fundus 230 and the exterior side 210 thereof, the unitary disk 200 having a second cavity 260 open at the frame facing side 210 thereof and separated from the first cavity by a common portion of the wall 242 joining the fundus 230 and the exterior side 210 thereof, the unitary disk 200 having an opening 226 in the common wall 242 between the first cavity 250 and the second cavity 260 therein, the unitary disk 200 being one piece. The fishing reel end plate 100 may further comprise a gear stud 120 in the first cavity 250 extending substantially perpendicularly from the substantially planar bridge 230 of the unitary disk 200, and may further comprise a gear sleeve 130 supported by the gear stud 120 and rotatable about the gear stud 120, wherein an end 136, 138 of the gear sleeve 130 distal the substantially planar bridge 230 of the unitary disk 200 extends out of the first cavity 250 of the unitary disk 200 for receiving a handle 60 at the distal end 136, 138 thereof; at least one gear 110 supported by the gear sleeve 130 and rotatable therewith in the first cavity 250 of the unitary disk 200 for engaging a rotatable shaft 32 extending through the generally central opening 252 between the frame facing and exterior sides 220, 210 of the unitary disk 200. The gear sleeve 130 may be threaded 138 near the distal end 136, 138 thereof, and the fishing reel end plate 100 may further comprise a drag wheel 50, 52 threadingly engaging the distal end 136, 138 of the gear sleeve 130 and a plurality of drag washers 54 on the gear sleeve 130 between the at least one gear 110 and the drag wheel 50, 52. A cover 40 may be attached to the exterior side 210 of the unitary disk 200 for covering the at least one gear 110. A pinion gear 150 may be provided on and rotatable with a shaft 32 extending through the generally central opening 252 between the frame facing 220 and exterior sides 210 of the unitary disk 200, wherein the pinion gear 150 may engage the at least one gear 110 in the first cavity 250 of the unitary disk 200 for rotating the rotatable shaft 32. The pinion gear 150 may be slideable axially on the rotatable shaft, and the fishing reel end plate 100 may further comprise a jack 180 extending through the opening 226 in the common wall 242 between the first cavity 250 and the second cavity 260 of the unitary disk 200 for slideably moving the pinion gear 150 on the rotatable shaft 32 for engaging and disengaging the pinion gear 150 and the at least one gear 110. The wall 242 joining the fundus 230 and the exterior side 210 of the unitary disk 200 may define a shoulder 240 for receiving a cover 40, and a cover 40 may be disposed on the shoulder 240 of the unitary disk 200 and attached to the exterior side 210 of the unitary disk 200 for covering the first cavity 250 thereof. The unitary disk 200 may have a generally circular periphery 202, and the bridge 230 may be disposed within the generally circular periphery 202 of the unitary disk 200.

A fishing reel end plate 100 may comprise: a unitary disk 200 having a periphery 202, having a frame facing side 220 and an opposing exterior side 210, and having a generally central opening 252 between the frame facing and exterior sides 220, 210 thereof, the unitary disk 200 having a substantially planar bridge 230 proximate the frame facing side 220 thereof defining the fundus 230 of a first cavity 250 open at the exterior side 210 thereof and having a wall 242 joining the fundus 230 and the exterior side 210 thereof, the substantially planar bridge 230 having a hole 232 therein that is spaced apart from the generally central opening 252 of the unitary disk 200 and is for receiving a stud 120 therein, the unitary disk 200 being one piece. The unitary disk 200 may have a second cavity 260 open at the frame facing side 220 thereof and separated from the first cavity by a common portion of the wall 242 joining the fundus 230 and the exterior side 210 thereof, and may have an opening 226 in the common wall 242 between the first cavity 250 and the second cavity 260 therein. The unitary disk 200 may have a generally circular periphery 202, and the substantially planar bridge 230 may be disposed within the generally circular periphery 202 of the unitary disk 200. A cover 40 may be attached to the exterior side 210 of the unitary disk 200 for covering the first cavity 250 thereof. A gear stud 120 may be in the first cavity 250 and may extend from the hole 232 in the substantially planar bridge 230 of the unitary disk 200, and the gear stud 120 may extend substantially perpendicularly to the substantially planar bridge 230 of the unitary disk 200. A gear sleeve 130 may be supported by the gear stud 120 and rotatable about the gear stud 120, wherein an end 136, 138 of the gear sleeve 130 distal the substantially planar bridge 230 of the unitary disk 200 may extend out of the first cavity 250 of the unitary disk 200 for receiving a handle 60 at the distal end 136, 138 thereof, at least one gear 110 may be supported by the gear sleeve 130 and rotatable therewith in the first cavity of the unitary disk 200 for engaging a rotatable shaft 32 extending through the generally central opening 252 between the frame facing and exterior sides 220, 210 of the unitary disk 200. A pinion gear 150 may be on and rotatable with a shaft 32 extending through the generally central opening 252 between the frame facing and exterior sides 220, 210 of the unitary disk 200, and the pinion gear 150 may engage the at least one gear 110 in the first cavity 250 of the unitary disk 200 for rotating the rotatable shaft 32. The wall 242 joining the fundus 230 and the exterior side 210 of the unitary disk 200 may define a shoulder 240 for receiving a cover 40, and a cover 40 may be disposed on the shoulder 240 of the wall 242 of the unitary disk 200 and attached to the unitary disk 200 for covering the first cavity 250 thereof.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

While the present invention has been described in terms of the foregoing example embodiments, variations within the scope and spirit of the present invention as defined by the claims following will be apparent to those skilled in the art. For example, while the location of gear stud 120 and thus gear sleeve 230 and main gear 140 are illustrated by gear stud being mounted in a gear stud hole 232 in an example location, gear stud hole 232 may be made in various locations that may be closer to or farther away from spindle hole 252 so that the gear ratio of gearing arrangement 110 (e.g., main gear 140 and pinion gear 150) may easily be varied.

By way of example, the illustrated arrangement typically provides a gear ratio of about 6.3 to 1 which reels in about 47 inches (about 1.85 meters) of fishing line for each 360° crank of handle 60 and is suitable for general fishing use. However, for fishing for large fish, a lower gear ratio is desirable, for example, a gear ratio of 4.25 to 1 which reels in about 39 inches (about 1 meter) of line per 360° crank. Bridge member 230 may extend radially beyond the generally circular periphery 202 of side plate 200 where necessary to move gear stud 220 farther from spindle hole 252 for obtaining a lower gear ratio, e.g., by increasing the diameter of pinion gear 150 and/or decreasing the diameter of main gear 140, or where the diameter of main gear 140 is large. Such extension may be integral with side plate 200 or may include a rear cover 280.

The end plate described herein is one piece in that it may be machined or forged from one piece of material, cast as a single piece, molded as a single piece, or welded or brazed from separate pieces to form a single piece. In addition, the periphery 202 of side plate 200 may be generally circular as described, but may have another shape consistent with the frame of the fishing reel on which it is mounted or may have an extension to cover a part, such as a gear, that extends beyond the periphery of the frame. It is noted that the terms end plate and side plate are alternative terms for the unitary plate described and may be used interchangeably herein.

While screws and pins are described as examples of fasteners in various places, it is understood that any suitable fastener may be employed in any place where fastening may be necessary or desirable, irrespective of the specific fastener described.

While drag 50 is described as having metallic and non-metallic washers having different center hole and peripheral shapes, any shapes that allow ones of washers 54 to rotate with handle 60 and others of washers 54 to be fixed with respect thereto would be suitable. Similarly, washers 54 may be of any material or materials that provide sufficient friction therebetween to provide drag.

While pinion gear 150 is described as sliding axially for engaging and disengaging spindle 32, pinion gear may engage and disengage main gear 140, spool 30 or another element to provide a spool-releasing function substantially as described.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A fishing reel having a one piece end plate comprising:
   a frame;
   a spool rotatably mounted in said frame;
   a one piece end plate mounted on an end of said frame, said one piece end plate defining a bridge for supporting at least one gear and defining a cavity for receiving at least one gear;
   at least one gear disposed in the cavity of said one piece end plate and supported by the bridge of said one piece end plate;
   a rotatable handle extending from said at least one gear for coupling said rotatable handle and said spool for rotating said spool in response to rotation of said handle; and
   a cover mounted to said one piece end plate for covering said at least one gear.

2. The fishing reel of claim 1 wherein the cavity of said one piece end plate and said at least one gear mounted therein are accessible from exterior said fishing reel when said one piece end plate is mounted to said frame and when said cover is removed.

3. The fishing reel of claim 1 further comprising:
   a ratchet in the cavity of said one piece end plate for constraining said at least one gear to rotate in only one direction; or
   a pinion gear coupled between said at least one gear and said spool and rotatable with said spool; or
   a pinion gear coupled between said at least one gear and said spool, wherein said pinion gear is rotatable with said spool and is slideable axially, and a jack for slideably moving said pinion gear for engaging and disengaging said pinion gear from rotation with said spool; or
   any combination of the foregoing.

4. The fishing reel of claim 1 further comprising a drag wheel threadingly engaging a shaft supporting said at least one gear and a plurality of drag washers on said shaft between said at least one gear and said drag wheel.

5. The fishing reel of claim 1 further comprising an eccentric arrangement for selectively disengaging said at least one gear and said spool for rotating said spool independently of rotation of said handle.

6. A fishing reel end plate comprising:
   a one piece plate having a periphery, having a frame facing side and an opposing exterior side, and having an opening between the frame facing and exterior sides thereof, said one piece plate having a bridge proximate the frame facing side thereof for supporting at least one gear and defining a first cavity open at the exterior side thereof for receiving at least one gear;
   a gear stud extending from the bridge of said one piece plate;
   a gear sleeve supported by said gear stud and rotatable about said gear stud, wherein an end of said gear sleeve distal the bridge of said one piece plate extends out of the first cavity of said one piece plate for receiving a handle;
   at least one gear supported by said gear sleeve and rotatable therewith in the first cavity of said one piece plate for engaging a rotatable shaft extending through the opening between the frame facing and exterior sides of said one piece plate; and
   a cover attached to the exterior side of said one piece plate for covering said at least one gear.

7. The fishing reel end plate of claim 6 wherein the bridge of said one piece plate provides a substantially planar fundus of the first cavity of said one piece plate.

8. The fishing reel end plate of claim 6 wherein a wall joining the fundus and the exterior side of said one piece defines a shoulder for receiving said cover.

9. The fishing reel end plate of claim 6 wherein said cover has an opening through which said gear sleeve extends.

10. The fishing reel end plate of claim 6 wherein said gear sleeve includes a ratchet engaging a dog for allowing said gear sleeve and said gear to rotate in only one direction.

11. The fishing reel end plate of claim 6 wherein said gear sleeve is threaded near the distal end thereof, said fishing reel end plate further comprising a drag wheel threadingly engaging the distal end of said gear sleeve and a plurality of drag washers on said gear sleeve between said at least one gear and said drag wheel.

12. The fishing reel end plate of claim 6 further comprising a pinion gear on the rotatable shaft, wherein said pinion gear is rotatable with said shaft and is slideable axially thereon, wherein said pinion gear engages said at least one gear in the first cavity of said one piece plate for rotating the rotatable shaft extending through the opening between the frame facing and exterior sides of said one piece plate.

13. The fishing reel end plate of claim 12 further comprising a jack for slideably moving said pinion gear on said rotatable shaft for engaging and disengaging said pinion gear from rotation with said rotatable shaft.

14. The fishing reel end plate of claim 13 wherein said one piece plate has a second cavity open to the frame facing side thereof, said fishing reel end plate further comprising an eccentric mechanism disposed in the second cavity and coupled to a yoke of said jack in the cavity of said one piece plate for slideably moving said pinion gear on said rotatable shaft.

15. The fishing reel end plate of claim 6 further comprising a handle mounted to the distal end of said gear sleeve for rotating said gear sleeve and said at least one gear.

16. A fishing reel end plate comprising:
a unitary disk having a periphery, having a frame facing side and an opposing exterior side, and having a generally central opening between the frame facing and exterior sides thereof, said unitary disk having a substantially planar bridge proximate the frame facing side thereof defining the fundus of a first cavity open at the exterior side thereof and having a wall joining the fundus and the exterior side thereof, said unitary disk having a second cavity open at the frame facing side thereof and separated from the first cavity by a common portion of the wall joining the fundus and the exterior side thereof, said unitary disk having an opening in the common wall between the first cavity and the second cavity therein, said unitary disk being one piece.

17. The fishing reel end plate of claim 16 further comprising a gear stud in the first cavity extending substantially perpendicularly from the substantially planar bridge of said unitary disk.

18. The fishing reel end plate of claim 17 further comprising a gear sleeve supported by said gear stud and rotatable about said gear stud, wherein an end of said gear sleeve distal the substantially planar bridge of said unitary disk extends out of the first cavity of said unitary disk for receiving a handle at the distal end thereof, and
at least one gear supported by said gear sleeve and rotatable therewith in the first cavity of said unitary disk for engaging a rotatable shaft extending through the generally central opening between the frame facing and exterior sides of said unitary disk.

19. The fishing reel end plate of claim 18 wherein said gear sleeve is threaded near the distal end thereof, said fishing reel end plate further comprising a drag wheel threadingly engaging the distal end of said gear sleeve and a plurality of drag washers on said gear sleeve between said at least one gear and said drag wheel.

20. The fishing reel end plate of claim 18 further comprising a cover attached to the exterior side of said unitary disk for covering said at least one gear.

21. The fishing reel end plate of claim 18 further comprising a pinion gear on and rotatable with a shaft extending through the generally central opening between the frame facing and exterior sides of said unitary disk, wherein said pinion gear engages said at least one gear in the first cavity of said unitary disk for rotating the rotatable shaft.

22. The fishing reel end plate of claim 21 wherein said pinion gear is slideable axially on said rotatable shaft, said fishing reel end plate further comprising a jack extending through the opening in the common wall between the first cavity and the second cavity of said unitary disk for slideably moving said pinion gear on said rotatable shaft for engaging and disengaging said pinion gear and said at least one gear.

23. The fishing reel end plate of claim 16 wherein the wall joining the fundus and the exterior side of said unitary disk defines a shoulder for receiving a cover, further comprising a cover disposed on the shoulder of said unitary disk and attached to the exterior side of said unitary disk for covering the first cavity thereof.

24. The fishing reel end plate of claim 16 wherein said unitary disk has a generally circular periphery, and wherein the bridge is disposed within the generally circular periphery of said unitary disk.

25. A fishing reel end plate comprising:
a unitary disk having a periphery, having a frame facing side and an opposing exterior side, and having a generally central opening between the frame facing and exterior sides thereof, said unitary disk having a substantially planar bridge proximate the frame facing side thereof defining the fundus of a first cavity open at the exterior side thereof and having a wall joining the fundus and the exterior side thereof, the substantially planar bridge having a hole therein that is spaced apart from the generally central opening of said unitary disk and is for receiving a stud therein, said unitary disk being one piece.

26. The fishing reel end plate of claim 25 wherein said unitary disk has a second cavity open at the frame facing side thereof and separated from the first cavity by a common portion of the wall joining the fundus and the exterior side thereof, said unitary disk having an opening in the common wall between the first cavity and the second cavity therein.

27. The fishing reel end plate of claim 25 wherein said unitary disk has a generally circular periphery, and wherein the substantially planar bridge is disposed within the generally circular periphery of said unitary disk.

28. The fishing reel end plate of claim 25 further comprising a cover attached to the exterior side of said unitary disk for covering the first cavity thereof.

29. The fishing reel end plate of claim 25 further comprising a gear stud in the first cavity and extending from the hole in the substantially planar bridge of said unitary disk, said gear stud extending substantially perpendicularly to the substantially planar bridge of said unitary disk.

30. The fishing reel end plate of claim 29 further comprising a gear sleeve supported by said gear stud and rotatable about said gear stud, wherein an end of said gear sleeve distal the substantially planar bridge of said unitary disk extends out of the first cavity of said unitary disk for receiving a handle at the distal end thereof; and at least one gear supported by said gear sleeve and rotatable therewith in the first cavity of said unitary disk for engaging a rotatable shaft extending through the generally central opening between the frame facing and exterior sides of said unitary disk.

31. The fishing reel end plate of claim 30 further comprising a pinion gear on and rotatable with a shaft extending through the generally central opening between the frame facing and exterior sides of said unitary disk, wherein said pinion gear engages said at least one gear in the first cavity of said unitary disk for rotating the rotatable shaft.

32. The fishing reel end plate of claim 25 wherein the wall joining the fundus and the exterior side of said unitary disk defines a shoulder for receiving a cover, and further comprising a cover disposed on the shoulder of the wall of said unitary disk and attached to said unitary disk for covering the first cavity thereof.

* * * * *